(12) United States Patent
Vikse et al.

(10) Patent No.: US 7,623,853 B2
(45) Date of Patent: Nov. 24, 2009

(54) SYSTEM AND METHOD FOR OVER THE AIR PROGRAMMING

(75) Inventors: Gordon Brent Vikse, Chaska, MN (US); Duvall D. Egle, Lakeville, MN (US); Kjell David Erickson, Richfield, MN (US); James Russell Lowell, Chanhassen, MN (US); Edward D. Terry, Shoreview, MN (US)

(73) Assignee: PeopleNet Communications Corp., Chaska, MN (US)

( * ) Notice: Subject to any disclaimer, the term of this patent is extended or adjusted under 35 U.S.C. 154(b) by 414 days.

(21) Appl. No.: 11/425,326

(22) Filed: Jun. 20, 2006

(65) Prior Publication Data

US 2007/0015499 A1   Jan. 18, 2007

Related U.S. Application Data

(63) Continuation of application No. 09/893,187, filed on Jun. 27, 2001, now Pat. No. 7,065,347.

(51) Int. Cl.
*H04M 3/00* (2006.01)
(52) U.S. Cl. .................... 455/419; 455/410; 455/418
(58) Field of Classification Search ............ 455/418, 455/419, 410
See application file for complete search history.

(56) References Cited

U.S. PATENT DOCUMENTS

| 5,230,052 A | 7/1993 | Dayan et al. |
|---|---|---|
| 5,261,055 A | 11/1993 | Moran et al. |
| 5,388,267 A | 2/1995 | Chan et al. |
| 5,473,775 A | 12/1995 | Sakai et al. |
| 5,701,492 A | 12/1997 | Wadsworth et al. |
| 5,797,023 A | 8/1998 | Berman et al. |
| 5,805,882 A | 9/1998 | Cooper et al. |
| 5,915,080 A | 6/1999 | Park |
| 5,930,504 A | 7/1999 | Gabel |
| 5,987,536 A | 11/1999 | Johnson et al. |
| 6,009,524 A | 12/1999 | Olarig et al. |
| 6,018,806 A | 1/2000 | Cortopassi et al. |
| 6,044,461 A | 3/2000 | Agha et al. |
| 6,070,012 A | 5/2000 | Eitner et al. |
| 6,122,733 A | 9/2000 | Christeson et al. |
| 6,154,838 A | 11/2000 | Le et al. |
| 6,175,919 B1 | 1/2001 | Ha |
| 6,182,187 B1 | 1/2001 | Cox et al. |
| 6,223,336 B1 | 4/2001 | Tojima |
| 6,341,373 B1 | 1/2002 | Shaw |
| 6,549,770 B1 | 4/2003 | Marran |
| 6,587,684 B1 | 7/2003 | Hsu et al. |

(Continued)

FOREIGN PATENT DOCUMENTS

WO   WO-0241147   5/2002

*Primary Examiner*—Patrick N. Edouard
*Assistant Examiner*—Wayne Cai
(74) *Attorney, Agent, or Firm*—Schwegman, Lundberg & Woessner, P.A.

(57) ABSTRACT

A system and a method for performing over the air programming ("OTAP") to update computer code in a remote computer. The method includes transmitting computer code over the air to the remote device and writing the computer code to at least one memory device located in the remote device. In one embodiment, the remote device is a cellular phone and the computer code is transmitted over a cellular phone network.

16 Claims, 3 Drawing Sheets

U.S. PATENT DOCUMENTS

| | | |
|---|---|---|
| 6,622,017 B1 | 9/2003 | Hoffman |
| 6,832,373 B2 | 12/2004 | O'Neill |
| 6,836,657 B2 | 12/2004 | Ji et al. |
| 7,065,347 B1 | 6/2006 | Vikse et al. |
| 2002/0193101 A1 | 12/2002 | McAlinden |
| 2003/0130928 A1 | 7/2003 | Chozick |

SYSTEM AND METHOD FOR OVER THE AIR PROGRAMMING

CROSS-REFERENCE TO RELATED APPLICATION(S)

This application is a Continuation of U.S. application Ser. No. 09/893,187, filed on Jun. 27, 2001, now issued as U.S. Pat. No. 7,065,347, herein incorporated by reference.

FIELD OF THE INVENTION

The present invention relates to over the air programming of remote devices. More specifically, the present invention relates to delivering computer code or software over the air to one or more remote devices and updating, modifying, or replacing the computer instructions on the remote device with the delivered computer code or software.

BACKGROUND OF THE INVENTION

Wireless computer networks enable many valuable applications. One such application is a vehicle communications and tracking system, which may be used, for example, to manage a fleet of vehicles. Such a fleet management system allows fleet managers, drivers, and suppliers to communicate and access vehicle tracking information. In such a system, the fleet vehicles are typically in communication with a home base through a wireless communication system, such as cellular phone network. Another application is the use of cellular phones for voice and data communication. Cellular phones are typically used for remotely tying in to the wire-based telephone systems and communicating with telephone users or other cellular phone users.

One challenge in operating these types of systems, which rely on wireless communication, is providing cost effective maintenance and upgrades to the on-board software. Currently, the remote devices in these systems must be returned to a servicing center for maintenance and programming updates. This is a significant nuisance to the user and can result in significant and costly down time. For example, if a cellular phone user requires a software update, the phone must be taken to a cellular phone distributor for reprogramming, which is expensive and an inconvenience to the user.

Many modern computers and microcontrollers are configured to execute computer code or instruction that is stored in non-volatile memory that is capable of being updated. Examples of such memory include electrically programmable read only memory ("EPROM"), electrically erasable programmable read only memory ("EEPROM"), and flash memory devices (e.g., "flash EEPROM"). In many of these systems, the code is updated by loading updated code from an update disk into non-volatile memory and then loading or "burning" the updated code into the programmable memory.

For wired computer systems such as computer terminals in a local area network ("LAN"), code updates may be effectuated by downloading the update code from a central computer, or server, to an appropriate local computer. This remote updating of the code reduces costs and efforts. Similar methods may be used to update other software, including application programs, in a wired computer system. These methods are enabled due at least in part to the ability to send the software updates over a secure medium, ensuring that the software updates arrive complete and uncorrupted.

Wireless computer networks, however, offer unique challenges to delivering software updates, because of the lack of a reliable connection between the remote device and the central computer. Moreover, these systems must be configured to recognize the presence of a software update and initiate a software update function.

There is a need in the art for a system and method of updating software on a remote wireless device. There is a further need in the art for a device capable recognizing receipt of a software update and initiating an update function. There is also a need for a method of updating software on a remote wireless device, which minimizes down-time of the device and disruption of service to the user.

BRIEF SUMMARY OF THE INVENTION

The present invention, in one embodiment, is a method of programming a remote device. The method includes transmitting computer code over the air to the remote device and writing the computer code to at least one memory device located in the remote device. In one embodiment, the remote device is a cellular phone and the computer code is transmitted over a cellular phone network.

Another embodiment of the present invention is a remote device for receiving and storing a computer code update. The device includes a receiver for receiving the computer code update, a programmable memory, and a microcontroller. The microcontroller is adapted to execute code for writing the computer code update into the programmable memory.

While multiple embodiments are disclosed, still other embodiments of the present invention will become apparent to those skilled in the art from the following detailed description, wherein is shown and described only the embodiments of the invention, by way of illustration, of the best modes contemplated for carrying out the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
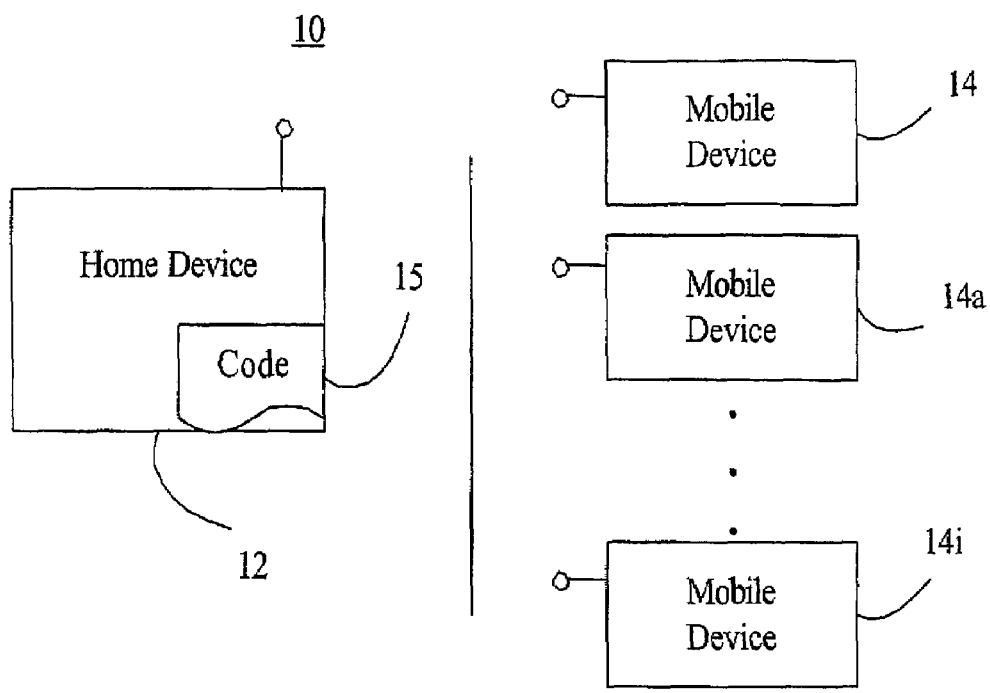
FIG. 1 is a block diagram of a system for over the air programming, according to one embodiment of the present invention.

FIG. 1 shows an over the air programming ("OTAP") system 10 for wireless updating of computer code or software. As shown in FIG. 1, the system 10 includes a home device 12 in wireless communication with one or more mobile devices 14. The home device 12 serves as an origination point for update software 15, and it includes a wireless communication system that is used to transmit or broadcast update software to the mobile devices 14. The mobile devices 14 includes a wireless communication system adapted to receive the update software from the home device 12 and to transmit or broadcast messages back to the home device 12.

Figure 2:
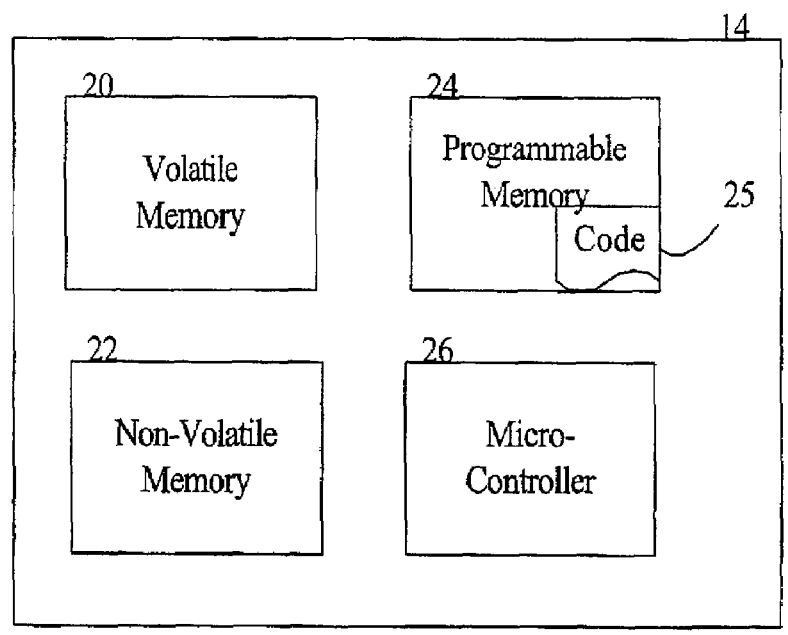
FIG. 2 is a block diagram of a remote device designed to receive the over the air programming, according to one embodiment of the present invention.

FIG. 2 is a block diagram illustrating the mobile device 14, according to one embodiment of the present invention. As shown in FIG. 2, the mobile device 14 includes a number of memory devices, including a volatile memory 20, a non-volatile memory 22, and a programmable memory 24. As shown, the programmable memory 24 includes a software module 25. The mobile device 14 further includes a processor or microcontroller 26, which is coupled to the memory devices 20, 22, 24. In one embodiment, the volatile memory 20 is a random access memory ("RAM") and the non-volatile memory 22 is a non-volatile random access memory ("NVRAM"). In another embodiment, other types of volatile and non-volatile memory are used with the mobile device 14. In various embodiments, the programmable memory 24 is an EPROM, an EEPROM, or a flash memory. In one embodiment, the programmable memory 24 is a flash memory having simultaneous read and write capability, which allows execution of code from one section while burning to another section, as known in the art. The programmable memory 24 can be any type of memory that can be rewritten and exhibits an appropriate level of permanence or persistence.

The software module 25 includes the computer instructions or code for execution by the microcontroller 26. In one embodiment, the software module 25 contains all the operating software necessary to interface with the operator of the mobile device 14 and with any other components of the mobile device 14. In an alternative embodiment, the mobile device 14 includes a general purpose computer having software loaded to support operation of the mobile device 14.

Figure 3:
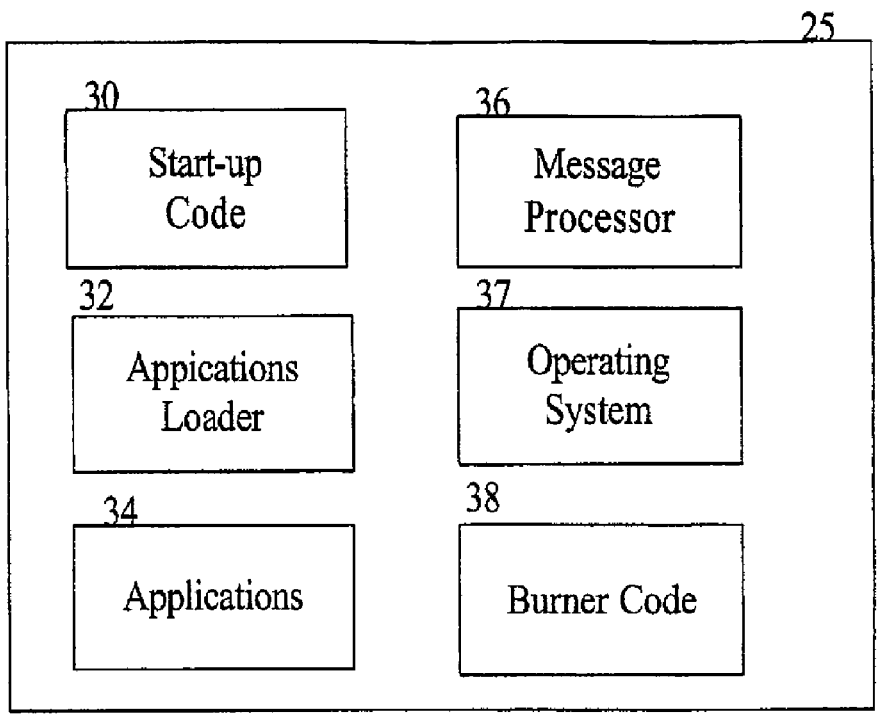
FIG. 3 is a block diagram of software code stored on the remote device of FIG. 2, according to one embodiment of the present invention.

FIG. 3 shows the components of the software module 25, according to one embodiment of the present invention. As shown in FIG. 3, the components include start-up code 30, an application loader 32, applications 34, a message processor 36, operating system code 37, and burner code 38. These software components provide functionality to the mobile device 14 and are used in the over the air programming function of the present invention. In particular, the start-up code 30, the message processor 36, and the burner code 38 operate to perform the software update function, as described in further detail below. Although FIG. 3 shows that all components of software of the mobile device 14 are stored in the programmable memory 24, in other embodiments some of the software modules may be stored in other memory locations within the mobile device 14.

Figure 4:
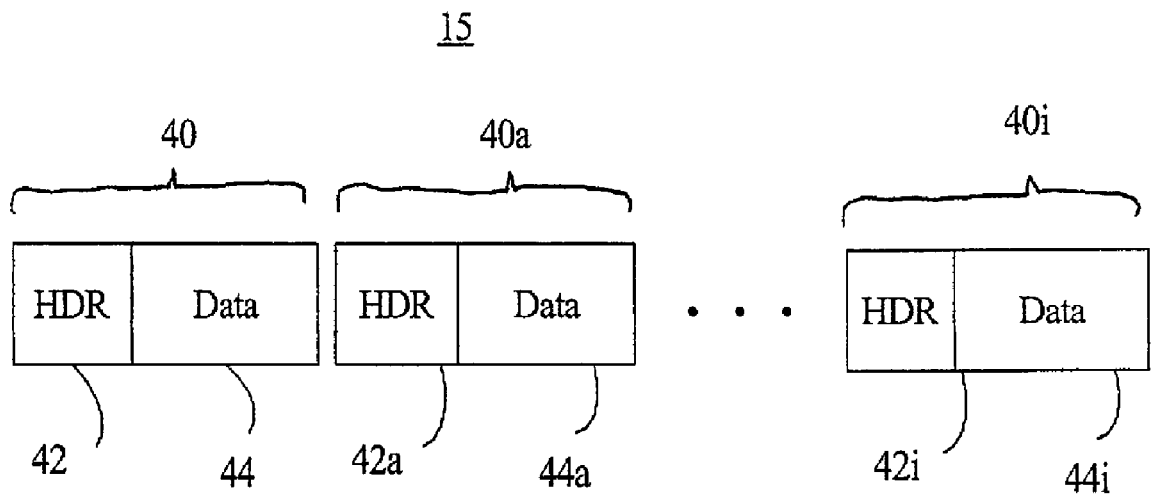
FIG. 4 is a diagram of a message used in the system of FIG. 1 to transmit programming, according to one embodiment of the present invention.

FIG. 4 is a block diagram illustrating the data structure of the update software 15, according to one embodiment of the present invention. As shown in FIG. 4, the update software 15 includes a plurality of packets 40, each including a header segment 42 and a data segment 44. As shown, in one embodiment, the update software 15 includes N data packets. In another embodiment, the update software 15 includes only one data packet. The use of data packets allows the code update to be sent as relatively small messages to minimize transmission errors and bandwidth consumption. These multiple data packets are then reconnected at the mobile device 14, as further described below.

The data segment 44 includes the software code that is intended to be received by the mobile device 14. The header segment 42 includes an identification of the packet 40 type (e.g., a software update) and an identification of which portion of the software module 25 it is intended to update. In one embodiment, the identification of which portion of the software module 25 it is intended to update is provided by an address in the programmable memory 24 corresponding to the appropriate code section. In one embodiment, the header segment 42 further includes an identification of the number of packets 40 that comprise the update software 15, and an indicator, or marker for each of the data packets. For example, if the update software 15 includes 5 data packets, header segment 42 may indicate that its data packet 40 is data packet 1 of 5. This packet information allows for transmission of smaller message sizes, which are then reassembled at the mobile device 14.

Figure 5:
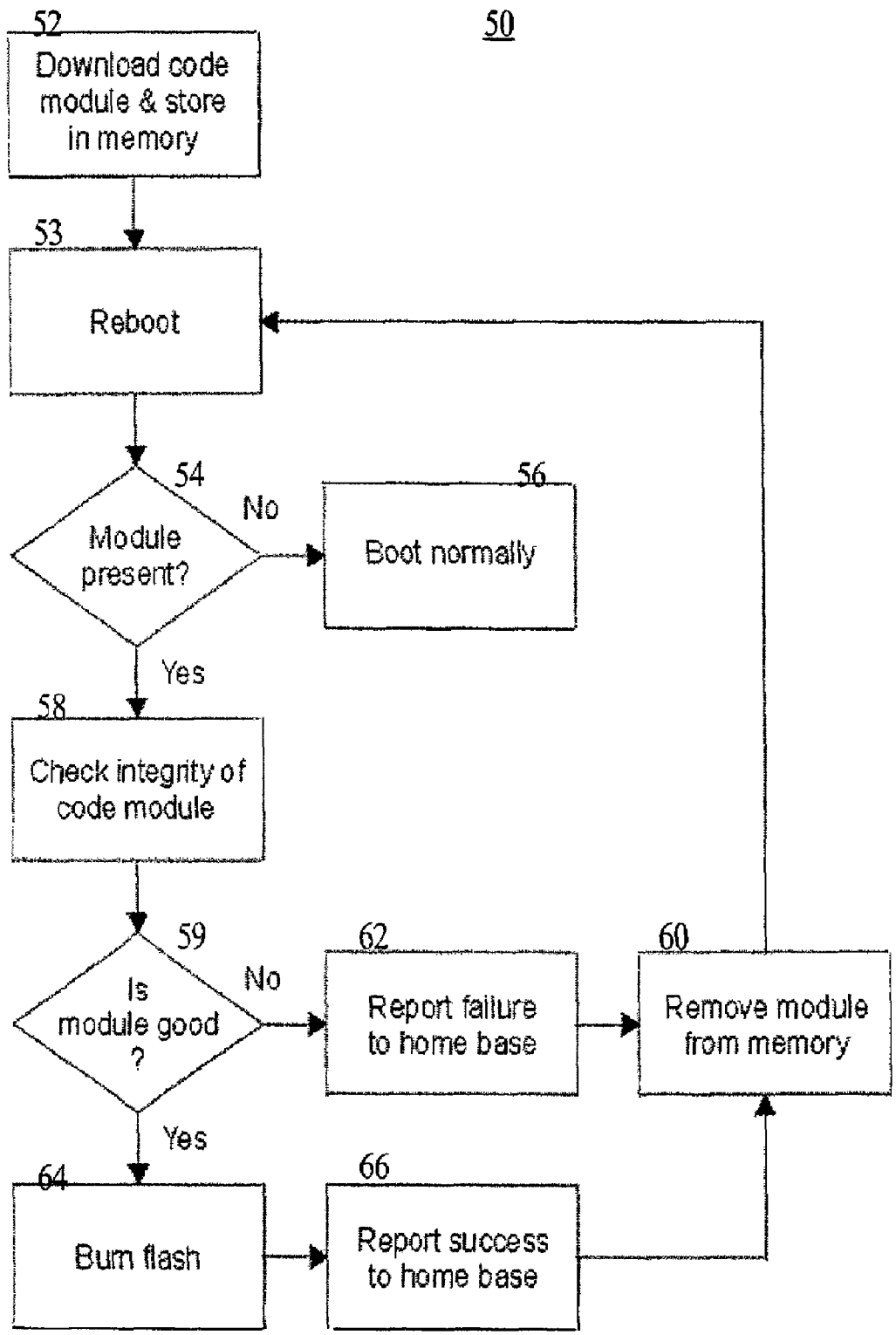
FIG. 5 is a flowchart of processes used to implement over the air programming, according to one embodiment of the present invention.

FIG. 5 is a flowchart showing a method 50 for programming a remote device, according to one embodiment of the present invention. As shown in FIG. 5, the mobile device 14 downloads the update software 15 from the home device 12 (block 52) over the wireless communications system. As described above, the update software 15 is sent as one or more packets 40. The message processor 36 of the mobile device 14 then reads the header segment 42 of the packet 40 to determine its type. If the packet 40 is update software, the message processor 36 stores the software in the non-volatile memory 22. In one embodiment, the storage address in the non-volatile memory 22 is determined by using a look-up table. The message processor 36 then stores packets 40 in the same series in successive locations in the non-volatile memory 22. In one embodiment of the present invention, during the transmission of the packets 40 from the home device 12 to the mobile device 14, the message processor 36 performs error checking, using a technique commonly known in the art. In one embodiment, the message processor stores the update software in the volatile memory 20.

In one embodiment, packets 40 of other types may be sent or received immediately before, after, or intermediate to packets of the update software type. This embodiment provides the advantage of allowing the mobile device 14 to continue to function normally for the user during the reception of update software. This minimizes down-time and inconvenience to the user. This configuration also allows the user to be given the opportunity to interrupt or cancel the download of the update software.

Each time the message processor 36 stores a packet 40 of update software in the non-volatile memory 22, the message processor 36 checks the specified addresses in memory for a complete segment (i.e., all packets 40 in the set) of update software 15. When a complete set of update software 15 is detected, the message processor 36 initiates a reboot of the mobile device 14 (block 53), such as by setting a reboot flag. In one embodiment, this reboot is accomplished using a specific software module which first shuts down all open application, such that a clean reboot is accomplished.

The mobile device 14 then reboots, causing the start-up code 30 to execute. The start-up code 30 checks the specified memory location for update software 25 (block 54). If no update software 25 or incomplete update software 25 is present, the start-up code 30 causes a normal boot (block 56). If a complete update software 25 is present, the start-up code 30 launches the burner code 38 (block 58).

The burner code 38 first checks that all pieces (i.e., packets 40) of the code segment are present and combines the code by removing the header segments 42 and abutting the data segments 44. The burner code 38 then checks the integrity of the update software 25 code segment (blocks 58, 59). If the integrity check fails, the burner code 38 removes the update software 25 from memory and cancels the code burn process (block 60). In one embodiment of the present invention, the burner code 38 causes the mobile device 14 to communicate the failure to the home device 12, so that an appropriate corrective action can be taken (block 62). In one embodiment, this reporting function is performed by the burner code 38 turning control over to an appropriate application 34, which then performs the reporting. In one embodiment, the burner code 38 also checks whether the update code segment is compressed and, if so, decompresses the code segment.

If the code segment passes the integrity check, the burner code 38 causes the code segment to be written or burned into the programmable memory 24 (block 64). The burner code starts the burn process at the address in the programmable memory specified in the header segment 42 of the update software 25. In one embodiment, the burner code 38 includes routines to burn a variety of different programmable memories, and the burner code 38 selects the correct routine based on the memory type. The burner code 38 then removes the code segment from non-volatile memory 22 (block 60). In one embodiment of the present invention, the burner code 38 causes the mobile device 14 to communicate the successful burn to the home device 12 (block 66). In one embodiment this reporting function is performed by the burner code 38 turning control over to an appropriate application 34, which then performs the reporting. In one embodiment, the burner code 38 does not perform integrity checking or combine code segments, but rather these steps are performed prior to the reboot. In this embodiment, the burner code 38 immediately cause the code segment to be burned into the programmable memory 24.

The burner code 38 then initiates another reboot of the mobile device 14 (block 53). During this reboot, because the update software 25 has been removed from the specified location in non-volatile memory 22, the start-up code 30 initiates a normal reboot. The mobile device will now reboot as normal and the applications loader 32 search the programmable memory 24 for applications 34 and will launch all appropriate applications 34, which may include the new or updated code segments.

In one embodiment, the method shown in FIG. 5 may be used to update any software stored on the mobile device 14. In another embodiment, some software modules are be reserved as not capable of being updated using the programming method, In one such embodiment, the start-up code 30 is designated as not updateable. In another such embodiment, the burner code 38 is designated as not updateable. These software modules are excluded from the programming method 50 because, if power is lost to the mobile device 14 during the burn operation (block 64), the memory area being burned could be left in an incomplete state. So long as the software modules being updated are not on the burn path (as shown in FIG. 5), the method 50 can be repeated until successful.

As will be apparent to those of ordinary skill in the art the system and method of the present invention could be used in a variety of application for performing programming updates to a remote device. In one embodiment, the mobile device 14 is a cellular phone for transmitting and receiving voice and data by connecting to a wire-based telephone system. Cellular phone service providers may wish to provide software updates to some or all of the cellular phones in their network. The system and method of the present invention would enable cellular phone service providers to accomplish such updates inexpensively and with minor interruption of service to its customers.

Another application of the present invention is use in on-board vehicle monitoring or guidance systems, such as commercial vehicles equipped with GPS components and connected to a central system. The present invention would enable quick and inexpensive updates to the software located on every commercial vehicles in the central system.

Another application of the present invention is in over-the-road trucks used in a national tracking and management system. The system 10 may be used with other mobile platforms, including ships and airplanes, for example. The system 10 may also be used with stationary platforms, and may be used in wired or wireless configurations. Finally, the home device 12 may also be a mobile or a stationary platform.

Although the present invention has been described with reference to preferred embodiments, persons skilled in the art will recognize that changes may be made in form and detail without departing from the spirit and scope of the invention.

We claim:

1. A method for programming computer code at a remote platform having a local computer, the local computer including a flash memory, the method comprising:
   receiving a plurality of computer code packets by wireless transmission;
   storing the plurality of computer code packets in a first memory of the local computer;
   recognizing reception of a complete copy of the computer code at the local computer;
   in response to such recognized reception, shutting down and rebooting the local computer;
   in response to rebooting the local computer, checking the integrity of the received computer code and burning the successfully checked computer code into the flash memory; and
   after burning the received computer code into the flash memory, erasing the stored computer code from the first memory; and restarting the local computer.

2. The method of claim 1 wherein the remote platform is a mobile platform.

3. The method of claim 1 wherein the mobile platform is a vehicle.

4. A method for updating computer code in a remote computer, comprising:
   downloading a plurality of messages, each of the plurality of messages comprising a segment of the computer code;
   storing the downloaded computer code in non-volatile memory; detecting when a
   complete set of the computer code comprising a complete set of the plurality of messages have been downloaded;
   in response to such detecting, rebooting the remote computer;
   in response to rebooting starting a computer code burn in process, comprising:
   assembling the complete set of the computer code into a continuous memory;
   checking the integrity of the downloaded computer code and if valid, burning the computer code in the continuous memory into a flash memory of the remote computer; and
   rebooting the remote computer.

5. The method of claim 4 wherein the remote platform is a mobile platform.

6. The method of claim 4 wherein the mobile platform is a vehicle.

7. A system for programming of computer code in a local computer having a flash memory, the system comprising:
   a central location that distributes updated computer code to the local computer using a wireless transmission medium;
   a receiver at the local computer that receives the updated computer code;
   a non-volatile memory at the local computer that stores the updated computer code;

a detection module at the local computer that detects when a complete copy of the computer code has been stored, and initiates a reboot process;

a burner program initiated during such reboot process that burns the computer code into the flash memory, and erases the computer code from the stored updated computer code from the non-volatile memory; and a reboot program that reboots the local computer after burning the computer code into the flash memory.

8. The system of claim 7 wherein the local computer is located on mobile platform.

9. The system of claim 8 wherein the mobile platform is a truck.

10. A method for programming a computer with computer code on a remote platform, the method comprising:

receiving wirelessly transmitted computer code;

storing the received computer code in a first memory of the local computer;

in response to storing a complete copy of the computer code, shutting down and rebooting the local computer;

detecting the presence of the received computer code in the first memory during such reboot;

in response to detecting the presence of the received computer code during the reboot, burning the received computer code into a second memory of the computer;

after the code has been burned into the second memory, restarting the local computer such that the burned in code is executable.

11. The method of claim 10 wherein the remote platform is a mobile platform.

12. The method of claim 11 wherein the mobile platform is a vehicle.

13. A method for updating computer code in a remote computer, comprising:

downloading a plurality of packets including computer code;

storing the downloaded computer code in a first non-volatile memory;

detecting when a complete set of the computer code has been downloaded;

upon such detecting, rebooting the remote computer;

during such rebooting, detecting the presence of the downloaded computer code in the first non-volatile memory;

in response to such detecting, starting a computer code burn in process, comprising:

checking the integrity of the computer code and burning the computer code into a second memory of the remote computer;

deleting the stored computer code from the first non-volatile memory; and rebooting the remote computer to execute the code burned into the second memory.

14. The method of claim 13 wherein the remote platform is a mobile platform.

15. The method of claim 13 wherein the mobile platform is a vehicle.

16. A method for programming a remote computer, the method comprising:

receiving wirelessly transmitted computer code;

storing the received computer code in a first memory of the local computer;

in response to storing a complete copy of the computer code, shutting down and rebooting the local computer;

detecting the presence of the received computer code after starting to reboot the local computer and burning the received computer code into a second memory of the computer;

after the code has been burned into the second memory, restarting the local computer such that the burned in code is executable.

* * * * *

UNITED STATES PATENT AND TRADEMARK OFFICE
CERTIFICATE OF CORRECTION

PATENT NO. : 7,623,853 B2　　　　　　　　　　　　　　　　　　　　　Page 1 of 1
APPLICATION NO. : 11/425326
DATED : November 24, 2009
INVENTOR(S) : Vikse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this

Twenty-sixth Day of October, 2010

David J. Kappos
*Director of the United States Patent and Trademark Office*